(12) United States Patent
Koch

(10) Patent No.: US 12,313,735 B2
(45) Date of Patent: May 27, 2025

(54) RADAR SENSOR, MOTOR VEHICLE, AND METHOD FOR OPERATING A RADAR SENSOR

(71) Applicant: AUDI AG, Ingolstadt (DE)

(72) Inventor: Niels Koch, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 281 days.

(21) Appl. No.: 17/753,022

(22) PCT Filed: Jul. 29, 2020

(86) PCT No.: PCT/EP2020/071344
§ 371 (c)(1),
(2) Date: Feb. 15, 2022

(87) PCT Pub. No.: WO2021/032423
PCT Pub. Date: Feb. 25, 2021

(65) Prior Publication Data
US 2023/0147256 A1    May 11, 2023

(30) Foreign Application Priority Data

Aug. 22, 2019 (DE) .......................... 102019212553.0

(51) Int. Cl.
*G01S 13/931*      (2020.01)
*G01S 7/02*        (2006.01)
(Continued)

(52) U.S. Cl.
CPC ............ *G01S 13/931* (2013.01); *G01S 7/024* (2013.01); *H01Q 1/3233* (2013.01); *H01Q 3/36* (2013.01); *H01Q 19/17* (2013.01); *H01Q 19/18* (2013.01)

(58) Field of Classification Search
CPC ..... G01S 13/931; G01S 7/024; H01Q 1/3233; H01Q 3/36; H01Q 19/17; H01Q 19/18
See application file for complete search history.

(56) References Cited

U.S. PATENT DOCUMENTS

| 4,210,357 A | 7/1980 | Adachi |
| 5,714,947 A | 2/1998 | Richardson et al. |
| | (Continued) | |

FOREIGN PATENT DOCUMENTS

| CN | 109839631 A | 6/2019 |
| DE | 2839848 A1 | 4/1979 |
| | (Continued) | |

OTHER PUBLICATIONS

International Search Report of the International Searching Authority directed to related International Patent Application No. PCT/EP2020/071344, mailed Oct. 26, 2020, with attached English-language translation; 5 pages.
(Continued)

*Primary Examiner* — Timothy A Brainard
(74) *Attorney, Agent, or Firm* — Sterne, Kessler, Goldstein & Fox P.L.L.C.

(57) ABSTRACT

A radar sensor for a motor vehicle, in particular a passenger car, is disclosed. The radar sensor has a control unit, an antenna arrangement, and a reflector device for reflecting transmitted radar signals from the antenna arrangement into a measurement region and radar signals, which are to be received by the antenna arrangement from the measurement region. The reflector device has a parabolic reflector. The control unit is designed to change the measurement region by changing the radiation characteristic and/or the reception characteristic, in particular by beamsteering and/or beamforming, during control of the antenna arrangement such that various reflection regions of the reflector device that correspond to different measuring regions are used.

15 Claims, 2 Drawing Sheets

(51) Int. Cl.
*H01Q 1/32* (2006.01)
*H01Q 3/36* (2006.01)
*H01Q 19/17* (2006.01)
*H01Q 19/18* (2006.01)

(56) References Cited

U.S. PATENT DOCUMENTS

| | | | |
|---|---|---|---|
| 5,724,042 A | 3/1998 | Komatsu et al. | |
| 6,366,234 B1 | 4/2002 | Katayama | |
| 7,518,566 B2 | 4/2009 | Schoebel | |
| 10,931,364 B2* | 2/2021 | Thain | H04B 7/185 |
| 10,985,471 B2 | 4/2021 | Shiozaki et al. | |
| 2005/0225481 A1* | 10/2005 | Bonthron | H01Q 21/0093 |
| | | | 342/175 |
| 2006/0092076 A1* | 5/2006 | Franson | H01Q 3/20 |
| | | | 343/711 |
| 2007/0195004 A1* | 8/2007 | Rebeiz | H01Q 1/3233 |
| | | | 343/876 |
| 2009/0251362 A1* | 10/2009 | Margomenos | G01S 13/931 |
| | | | 342/175 |
| 2013/0012144 A1* | 1/2013 | Besoli | H01Q 1/36 |
| | | | 455/84 |
| 2017/0222327 A1* | 8/2017 | Retter | H01Q 3/2658 |
| 2018/0083363 A1* | 3/2018 | Izadian | H01Q 19/10 |
| 2018/0231651 A1* | 8/2018 | Charvat | G01S 7/282 |

FOREIGN PATENT DOCUMENTS

| | | |
|---|---|---|
| DE | 19749397 A1 | 5/1998 |
| DE | 19749752 A1 | 7/1998 |
| DE | 19956262 A1 | 12/2000 |
| DE | 102004016982 A1 | 10/2005 |
| DE | 102016216176 A1 | 3/2018 |
| JP | H 05273339 A | 10/1993 |
| JP | H05273340 A | 10/1993 |
| JP | 2002009543 A | 1/2002 |

OTHER PUBLICATIONS

International Preliminary Report on Patentability directed to related International Patent Application No. PCT/EP2020/071344, issued Feb. 17, 2022, with attached English-language translation; 19 pages.

* cited by examiner

RADAR SENSOR, MOTOR VEHICLE, AND METHOD FOR OPERATING A RADAR SENSOR

TECHNICAL FIELD

This disclosure relates to a radar sensor for a motor vehicle, in particular a passenger car, the radar sensor having a control unit, an antenna arrangement and a reflector device for reflecting transmitted radar signals from the antenna arrangement into a measurement region and radar signals to be received by the antenna arrangement from the measurement region, the reflector device having a parabolic reflector. The disclosure also relates to a motor vehicle and a method for operating such a radar sensor.

BACKGROUND

Radar sensors are used in modern motor vehicles, in particular in cars, for a large number of purposes. The radar sensors supply the radar data thereof to other vehicle systems, for example driver assistance systems, where the radar data, which in particular describes the surroundings of the motor vehicle, can be evaluated accordingly. An important type of radar sensors in this context are long-range radar sensors (LRR—long range radar), which can be used, for example, for longitudinal vehicle functions such as Automatic Cruise Control (ACC). This means that the radar sensors are installed in the motor vehicle such that they can look far ahead along the road and thus detect other road users. In the case of an ACC function, for example, preceding road users can be detected in order to approach the legal minimum distance to the preceding road user and to adjust the speed. In order to achieve a speed adjustment with respect to the preceding road user that is as good and as uniform as possible, the long-range radar sensors used today are usually high-performance and focus their measurement region on the driving path of the motor vehicle. This ensures a long range and good object detection. In another example, rear radar sensors, in particular also long-range radar sensors, can be used to detect radar data regarding following road users, which can be used for automatic lane change functions, for example.

In all these cases, however, it is important to transfer the transmission power, which can be generated, for example, in a highly integrated monolithic transceiver circuit (MMIC) as part of a control unit of the radar sensor, to the antenna elements of the antenna arrangement of the radar sensor with low losses. Analogously to this, received radar signals have to be forwarded to the receiver of the control unit with low losses and in an interference-immune manner. In addition to the pure energy transfer from the MMIC to the antenna arrangement, the antenna arrangement itself plays a decisive role in the quality of a radar sensor.

Current MIMIC radar circuits can generate a transmission power of 10-13 dBm, which corresponds to a maximum of approx. 20 mW. When using higher transmission powers, damage can occur in the control unit, in particular on chips/integrated circuits, in particular as a result of the heat generated. Increasing the transmission power is therefore not a feasible way of obtaining a greater range of a radar sensor in a motor vehicle. The inter-connection of a plurality of MMICs also has a limited effect.

Different types of antenna arrangements are used in automotive radar applications. For example, patch antennas are known as planar radiators, which have an antenna gain of approx. 9 dBi. A plurality of patch antennas can easily be interconnected to form antenna groups. The main radiation direction of an antenna arrangement having patch antennas is oriented along the surface normals of the patch antennas. In particular in the case of antenna arrangements comprising a plurality of antenna elements, in this case therefore a plurality of patch antennas, this can quickly lead to an increase in the area which the antenna arrangement requires. This is in clear contradiction to the limited installation space available inside the motor vehicle.

In one example, in order to generate a sufficiently high antenna gain, four patch antennas are to be arranged vertically one after the other, which means at least 16 mm overall height at a wavelength of 4 mm for the 77 GHz frequency band, without taking the housing of the radar sensor into account, since each patch antenna has to have an extension at least half the wavelength. An antenna gain of only 11-12 dBi is achieved by means of the four patch antennas mentioned by way of example. In order to reach 15 dBi, it is necessary to double the antenna area. Since an enclosing housing is also constructed, installation heights of more than 40 mm, in particular up to 50 mm, are often necessary in the case of appropriate radar sensors for motor vehicles.

However, installation spaces having a height of at least 40 mm are very rare in motor vehicles, in particular at the front of the vehicle. For example, ribs of a radiator grille are usually 25-30 mm apart, and the black printed portion in a windshield of the motor vehicle rarely exceeds 20 mm at the edges. Spoiler heights are also usually limited to 15 mm at the rear. As a result, it is very difficult to expediently install long-range radar sensors having planar radiator antennas inside motor vehicles.

Another type of antenna is the so-called horn radiator. This antenna shape usually builds up in the direction of the radiation direction, the so-called horn becoming larger as the desired antenna gain increases. In particular, the horn expands and the horn radiator becomes longer. Even in the case of such horn antennas in radar sensors, the available installation space can quickly become tight. This problem in particular arises when antenna arrangements having a plurality of antenna elements are required. If only one thinned antenna array is used, which is also referred to as a sparse matrix, increasing side lobes can occur in the radiation characteristics, which are undesirable for radar applications, since the directional assignment of detected objects is then ambiguous.

DE 199 56 262 A1 relates to a vehicle radar in which the antenna unit has a single electromagnetic radiator for radiating the electromagnetic transmission wave, a single reflector for reflecting the electromagnetic transmission wave from the electromagnetic radiator and for radiating the electromagnetic transmission wave as a beam, and a reflector pivoting device for pivoting the reflector such that the direction of the beam is successively changed. The reflector may be an offset parabolic antenna having a shape obtained by cutting part of a paraboloid of revolution.

DE 197 49 752 A1 relates to a vehicle collision prevention system which has a vehicle control sensor having a radiation source, an articulated reflector for directing radiation from the source in a desired direction, an articulated mechanism for carrying out the deflection of the articulated reflector, and a closed-loop control loop, which responds to the vehicle steering sensor, for controlling the deflection mechanism in order to cause the articulated reflector to direct radiation in a direction which substantially coincides with the direction in which the vehicle is turning. The articulated reflector can be shaped as an elliptical paraboloid, i.e. as a section of a paraboloid, with an elliptical outer contour.

In this way, scanning radar sensors can be provided, the antenna gain being increased due to the parabolic reflector. However, the corresponding mechanical actuators are complex and also require considerable installation space.

BRIEF DESCRIPTION OF THE DRAWINGS/FIGURES

DETAILED DESCRIPTION

Figure 1:
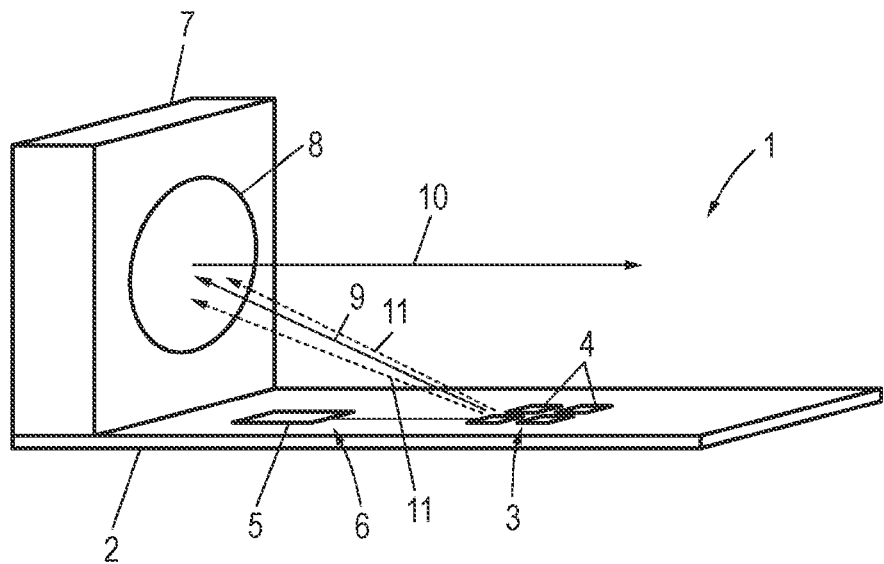
FIG. 1 illustrates a schematic diagram of the mode of operation of a radar sensor, according to some aspects of this disclosure.

The problem addressed by the disclosure is therefore that of providing a space-efficient design of a radar sensor that provides good coverage and range and at the same time makes the best possible use of the installation space available in the motor vehicle, without the need for complex mechanics.

In order to solve this problem, according to the disclosure, in a radar sensor of the type mentioned at the outset, the control unit is designed to change the measurement region by changing the radiation characteristic and/or the reception characteristic, in particular by beamsteering and/or beamforming, during control of the antenna arrangement such that various reflection regions of the reflector device that correspond to different measurement regions are used.

It is therefore proposed to also carry out a deflection of the radar signals using a reflector device, but to not make the development of different measurement regions dependent on mechanical actuators, but rather to achieve different reflection regions of the reflection device by changing the radiation characteristic, in particular by means of beamsteering, and/or the reception characteristic, in particular by means of beamforming. In other words, the radiated radar lobe can be positioned, for example, such that a specific reflection region of the reflector device is illuminated, which results in a specific measurement region due to the reflective properties. The reflected radar signals can also be selected from a specific reflection region which corresponds to a measurement region by beamforming, for example. In this way, a smaller antenna arrangement can be selected, since an overall detection region formed by the various measurement regions can also be provided by a corresponding selection of reflection regions of the reflector device. In addition, the deflection of the radar signals by the reflector device makes a changed geometric position of the antenna device possible, which can be used for a design of the radar sensor that uses existing installation space in the motor vehicle more efficiently. The radar sensor is preferably a long-range radar sensor (Long Range Radar—LRR), the radar data of which can be used, for example, by a longitudinal driver assistance system.

The paraboloid shape of the reflection surface of the reflector is expediently designed such that the antenna gain is increased by bundling. In this case, the overall radiation characteristic, i.e. the radiation diagram, of the antenna arrangement can be designed such that it optimally illuminates the reflector as a paraboloid. As a result of the shape of the reflector as a parabolic mirror, it is not only possible for radar signals to be deflected, but bundling also occurs. In this case, a strong bundling of the radiation pattern is referred to as a high antenna gain. A patch antenna acting as a primary radiator, as an antenna element of an antenna arrangement, has, for example, an antenna gain of approximately 9 dBi. If a parabolic mirror is now used as the reflector of the reflector device, the bundling leads to a considerable increase in antenna gain to, for example, 25-35 dBi.

Since the disclosure provides an electronically pivotable radar system without a mechanical apparatus, a simple design is also possible. In other words, in the present disclosure, the control unit is in particular designed to adjust all measurement regions to be used by the radar sensor solely by changing the radiation characteristic and/or the reception characteristic, in particular by means of beamsteering and/or beamforming, i.e. no mechanical components are required.

A radar sensor is therefore provided which has at least one specially shaped, parabolic reflector as part of a reflector device which deflects radiation energy of the antenna arrangement or reflected radar signals and bundles them in the case of transmission. The deflection allows the radar sensor to have a different shape/design, in order to exploit new and different installation spaces. In addition to the deflection in a different radiation direction, bundling and thus an increased antenna gain also take place.

The control unit can expediently include an MMIC chip which provides the transmission power. For example, the MIMIC chip can provide a transmission power of 10-13 dBm. This is still well below legally prescribed maximum transmission powers, in one example 55 dBm. Should this be achieved according to the prior art when using patch antennas as antenna elements of an antenna arrangement without using the reflector device according to the disclosure, an interconnection to an antenna array of more than 100 antenna elements would be necessary. In the case of a size of 2 mm per antenna element in the 77 GHz band and an antenna spacing of 2 mm from one another, 400 mm or, in other words, a size of the radar sensor of 40 cm would be necessary, such that an installation space would be required that is not available in modern motor vehicles.

However, since a parabolic reflector is used as part of the reflector device according to the present disclosure, the initial radiation power is bundled and the antenna power is increased to up to 40 dBi, depending on the size of the reflector, such that the upper power limits of legal requirements can be approached in a simple manner. Tests have shown that in the case of a reflector size of only 16 mm in diameter, an increase in antenna gain to 32 dBi results in the 77 GHz band, i.e. the automotive radar band from 76 to 81 GHz.

Generally speaking, the reflector height can in particular be between 8 and 20 mm in this case. The size of the reflector, specifically the diameter of the paraboloid, can in this case be made dependent on the height of the installation space available in the motor vehicle. If, for example, only 12 mm installation height is available, for example in a rear spoiler or below a headlight, an antenna gain of approx. 24 dBi can still be achieved using a reflector designed as a parabolic mirror that has a diameter of 10 mm. This antenna gain is still 6 dB higher than in the case of current planar radiator arrays having approx. 12-15 dBi, which means twice the radar detection range without being impacted by installation space restrictions.

The use of a parabolic reflector in the context of the present disclosure also has further advantages, as shown by the embodiments discussed below. In particular, improvements can be achieved with regard to the effective range (i.e.

the possible measurement regions) of the radar sensor, directional agility, polarization agility and interference immunity.

One of the great advantages of the present disclosure is the effective utilization of installation space in motor vehicles by means of novel designs of the radar sensor. The present disclosure in particular allows the radar sensor to be designed such that the extension on the radiation side is smaller than the extension on at least one, in particular both, of the other sides of the radar sensor. The radar sensor can in particular have a rectangular housing, the outer surface of which is smaller on the radiation side than the extension of at least one other side, in particular of both other sides. The wall thickness of such a housing can be 1 mm, for example.

In a particularly advantageous embodiment of the present disclosure, the radar sensor can have a printed circuit board carrying the, in particular planar, antenna arrangement, the surface normal of which circuit board is oriented substantially perpendicularly to the radiation direction of the radar sensor and/or on which the reflector device is arranged on a radiation side of the antenna arrangement. While it was previously necessary for the planar antenna arrangement in motor vehicles to be on the radiation side of the radar sensor, i.e. the size of the antenna arrangement had a significant influence on the installation space required there, in particular the installation height, other arrangements of the antenna elements of the antenna arrangement are possible in the context of the present disclosure. This is achieved by changing the signal path through the reflection surfaces provided by means of the reflector device. In the context of the present disclosure, it is thus possible to equip a printed circuit board or a substrate with the components which are necessary for a radar sensor, in particular also components of the control unit, as usual. This equipped printed circuit board is provided with the reflection device having the parabolic reflector, which reflection device is positioned above the circuit provided on the circuit board together with the antenna arrangement but leads to the radar signals not being radiated perpendicularly to the printed circuit board, but instead substantially along the orientation of the printed circuit board. This results in a much smaller installation space requirement in the critical height direction. In other words, the shape of the radar sensor is changed from being planar in the effective direction to the narrow sides being in the effective direction and, due to the use of the parabolic reflector, a greater range is also achieved.

As already indicated, this is always expedient when only small installation heights are available, for example in a rear spoiler or below a headlight. Another example is the arrangement between individual ribs of a radiator grille or behind a darkened region of a windshield.

In an expedient embodiment of the radar sensor according to the disclosure, at least some of the different reflection regions can be subregions of the parabolic reflector. If different subregions of the parabolic reflector are irradiated or forwarded for reception, different measurement regions result, since different (partial) reflection properties are present in the different reflection regions. In this way, it is in particular possible to provide a scanning radar sensor, such that the control unit for operating the radar sensor can expediently be designed as a scanning radar sensor. For this purpose, it can specifically be provided that the control unit is designed to control the antenna arrangement to sweep over a trajectory of successive reflection regions on the parabolic reflector. For example, the reflection regions can be selected so as to change over time from left to right over the parabolic reflector, such that the measurement region passes through a desired detection region to be achieved by scanning from right to left. In this context, there are preferably a plurality of antenna elements to be used as transmitting antennas, such that the primary radiation characteristic or the reception characteristic can be changed for the antenna elements by changing the phase, in particular by means of phase shifters, in particular in the sense of a directional pivoting in a specific angular range, for example of ±15°. After passing through the parabolic reflector, the combined radiation pattern can thus scan a specific detection region, which can also be referred to as the effective range. In this case, it should be noted that a change in direction, for example to the left with respect to the antenna arrangement, causes a change in direction inversely to the right after reflection by the parabolic reflector. This is correspondingly taken into account in the control unit, for example specifically in the control software or evaluation software, in order to achieve a correct evaluation, in particular to allow correct angle assignments.

In a particularly advantageous development in this context, the control unit is also designed to control the antenna arrangement to simultaneously sweep over different trajectories of successive reflection regions on the same reflector and to identify the radar signals of the respective, simultaneously used reflection regions. In this way, for example, two opposing scanning directions can be provided. For example, while one radar lobe pivots to the right, another radar lobe can pivot synchronously to the left. In this case, a suitable coding of the radar signals is expediently carried out in order to separate or identify the radar signals of the different radar lobes that are reflected by an object. An exemplary variant for coding radar signals during simultaneous transmission is described, for example, in DE 10 2016 216 176 A1. The use of a plurality of synchronous scan trajectories has the advantage that no blind region is created during the scanning process. In particular, when the two radar lobes are in the center, the transmission power is doubled due to superposition and thus an even greater range results in a preferred direction. This can be used, for example, to be particularly far-reaching or "detection-safe" in a main emission direction as the preferred direction, while the remaining portions of the detection region formed by the individual measurement regions are detected with a normal range. In other words, overlapping measurement regions can be present for at least some of the simultaneously illuminated reflection regions and/or the two radar lobes can be oriented toward the same measurement region in the preferred region.

In a particularly advantageous embodiment of the present disclosure, the reflector device can have a plurality of parabolic reflectors oriented toward specific measurement regions, the reflection regions being located at least partially on different reflectors. This means, for example, that for each first reflection region located on a first parabolic reflector, there is at least one second reflection region located on another of the parabolic reflectors. In an embodiment having a plurality of reflectors, it is therefore possible to direct radar lobes of the antenna arrangement onto different parabolic reflectors or to receive the radar lobes from different parabolic reflectors. These reflectors can, for example, be assigned to different measurement regions, where this can also be achieved by a different arrangement relative to the antenna arrangement or a partial antenna of the antenna arrangement, but with the same orientation of the reflectors. If, for example, the radar lobe directly impinges on a parabolic mirror provided by a reflector, the radar signal is also emitted directly, while, in the case of an obliquely adjacent, identically oriented reflector, a deflection to the side occurs.

In this context, it is also conceivable that the antenna arrangement has partial antennas which can be assigned to different reflectors, the control unit being designed to control the partial antennas for simultaneous transmission using the respectively assigned reflectors. An antenna arrangement can therefore, for example, illuminate two adjacent reflectors of the reflector device and thus implement, for example, left-hand-side and right-hand-side monitoring, and thus a left-hand-side and right-hand-side measurement region, with only one initial antenna arrangement being required. In this context, it is also conceivable that at least one reflection region includes portions of at least two reflectors, such that a simultaneous deflection of the signal path for different, spatially separate measurement regions is also made possible in this sense.

In general, it should be noted at this point that the specific shape of the at least one parabolic reflector plays an important role. The radiation direction and the measurement regions of the radar sensor can be determined or adjusted by the shape. In addition, the range can be adapted to requirements and, as will be discussed in greater detail below, interference can be at least partially masked out. The size and shape of the parabolic reflector also determines the sensor dimensions and thus the installation space required. By contrast, the actual antenna arrangement loses some of its importance, although it is expedient to design the arrangement such that it can illuminate the reflector surface of the at least one parabolic reflector as well as possible, i.e. such that is not too small, so that no valuable reflector surface is wasted, and not too wide, in order to not to waste radiation energy beyond the edges of the parabolic reflector.

Specifically, the antenna arrangement can have at least one antenna element designed as a patch antenna and/or dielectric resonator antenna and/or slot antenna. In this case, an embodiment is expediently selected in which the antenna arrangement has a plurality of antenna elements forming an antenna array in order to enable beamsteering and/or beamforming, as is known in principle. In the context of the present disclosure, slot antennas and/or dielectric resonator antennas, which can be made very small and are not very complex to produce, are particularly preferred.

In a particularly preferred embodiment of the present disclosure, the at least one antenna element designed as a slot antenna is formed in a waveguide, which is in particular substrate integrated. In particular, slot antennas are thus used as an antenna array in a substrate integrated waveguide (SIW). The waveguides can, for example, be integrated into the already mentioned printed circuit board. Slot antennas have the advantage of already having a good antenna gain of, for example, 9 dBi as an initial radiator. A paraboloid can be used in the best possible manner by an antenna array of slot antennas having a 95-90% illumination area, such that a significant increase in antenna gain, for example to approx. 34 dBi, can be achieved.

In an advantageous development of the present disclosure, the control unit can be designed to operate the antenna arrangement for polarimetric measurement, in particular for simultaneous illumination of the same measurement region with differently polarized radar signals. If an antenna arrangement is used, by means of which radar signals of different polarity can be generated and measured, a so-called "diversity effect" can also be used in the context of the present disclosure, which means that two or more radar signals can be emitted at the same time via the same antenna arrangement and using the same reflection regions, such that objects to be identified can be measured with a plurality of polarizations. Various approaches to polarimetry can also be used in the context of the present disclosure, for example the consideration of copolar and cross-polar reflection components caused by the complex shape of objects and/or the even or odd number of reflections at different points, for example ground reflections, guard rails, other motor vehicles and the like. The antenna arrangement according to the disclosure having a plurality of polarizations is able to process all reflection components and thus significantly increase the detection probability or, in general, the performance of the radar sensor.

In the context of the present disclosure, improved processing, in particular masking, of interference sources is also possible. Such interference sources can be produced, for example, by other radar sensors in the motor vehicle itself or by other road users. Since a parabolic mirror is used as a reflector, interference can already be masked by the high degree of bundling in the sense that the interference is of significantly lower strength or can no longer be detected at all due to a narrower selection of the measurement region. Moreover, in the case of the use of different polarizations, as described above, interference attenuation is also conceivable when the polarization is changed.

In this context, it is also expedient if the control unit is designed for digital beamforming when receiving radar signals, in particular for masking a solid angle segment having an interference source. In the antenna arrangement designed as an antenna array, a type of arrangement of the antenna elements can be selected such that, where there is an interference source, and interference consequently occurs, a "zero point" is generated such that the interference is attenuated or even masked. In other words, it can be ensured that interference signals from a specific solid angle segment are no longer received in a processable manner.

In addition to the radar sensor, the present disclosure also relates to a motor vehicle, in particular a passenger car, comprising at least one radar sensor according to the disclosure. This can be designed for better use of existing installation spaces, as has already been described, such that the aforementioned advantages also result.

In particular, at least one of the at least one radar sensors can be covered and/or installed in an installation space in the motor vehicle that has a vertical extension of less than 20 mm, in particular in a rear spoiler and/or below a headlight. In particular installation locations having a low installation height can be expediently used by the radar sensor according to the disclosure, since the antenna array of the antenna arrangement can be installed "transversely," in particular on the printed circuit board in a horizontal plane, due to the deflection of the signal paths by the reflector device, which can significantly reduce the height of the radar sensor, but can still allow the same antenna gains and/or angular resolution capabilities.

Finally, the disclosure also relates to a method for operating a radar sensor of the type according to the disclosure, in which the control unit, during control of the antenna arrangement, changes the measurement region by changing the radiation characteristic and/or the reception characteristic, in particular by beamsteering and/or beamforming, such that various reflection regions of the reflector device that correspond to different measurement regions are used. All statements relating to the radar sensor according to the disclosure apply analogously to the method according to the disclosure, such that the advantages mentioned can also be obtained with this method.

Figure 2:
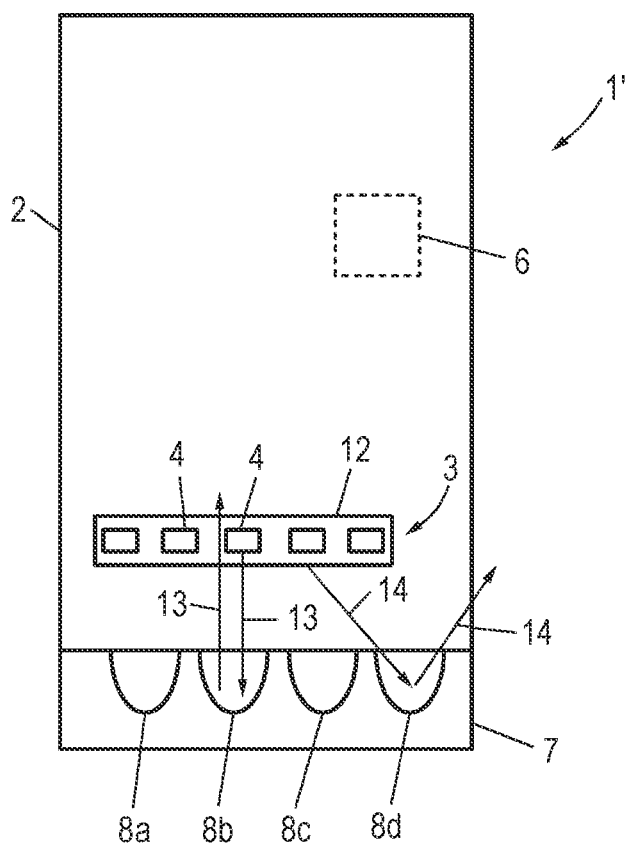
FIG. 2 illustrates a plan view of a printed circuit board of a radar sensor, according to some aspects of this disclosure.
Figure 3:
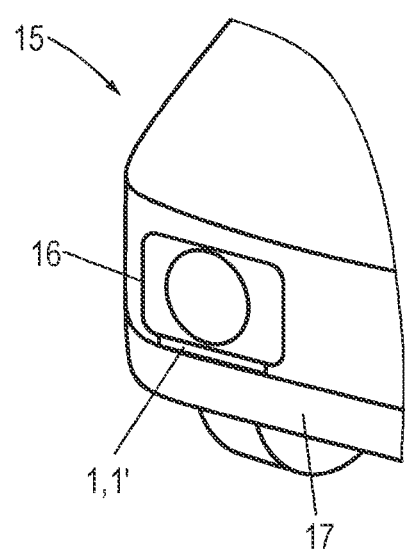
FIG. 3 illustrates a detail of a motor vehicle, according to some aspects of this disclosure.

Further advantages and details of the present disclosure can be found in the embodiments described below and with reference to the drawings, in which:

FIG. 1 is a schematic diagram of the mode of operation of a radar sensor according to some aspects of the disclosure;

FIG. 2 is a plan view of a printed circuit board of a radar sensor according to some aspects of the disclosure, and FIG. 3 shows a detail of a motor vehicle according to some aspects of the disclosure.

FIG. 1 is a schematic diagram of essential components of a radar sensor 1 according to some aspects of the disclosure and the corresponding operating principle. The radar sensor 1 includes a printed circuit board 2 which can also be referred to as a substrate and is held in a housing of the radar sensor 1. In the present case, the printed circuit board 2 is equipped with an antenna arrangement 3, of which only four antenna elements 4 of an antenna array of patch antennas are shown here for the sake of clarity, and with components of a control unit 6, shown here only in the form of a chip 5, which are designed to control the antenna arrangement 3 to emit radar signals and to receive reflected, received radar signals by means of the antenna arrangement 3.

Furthermore, a reflector device 7 having, in the present case, a parabolic reflector 8, which therefore has the shape of a parabolic mirror, is also arranged on the printed circuit board 2. The antenna arrangement 3 in this case does not radiate in the direction of the surface normal, but instead onto a reflection surface of the reflector 8, which, due to its parabolic design, bundles the radar radiation, thus increasing the antenna gain, and deflects it in a radiation direction, as shown by the arrows 9 and 10, the radiation direction extending substantially in parallel with the extension surface of the printed circuit board 2. In this case, the control unit 6, in particular by means of beamsteering and/or beamforming, can generate various radiation characteristics and/or reception characteristics, specifically radar lobes, by means of the antenna arrangement 3, each of which illuminates or receives from a specific reflection region of the reflection surface of the reflector 8, such that different measurement regions result. Since a parabolic reflector 8 is shown in the present case and different reflection regions can be used by different radar lobes, as further shown by the dashed arrows 11, the radar sensor 1 can be operated by the control unit 6 as a scanning radar sensor. In this case, it is in particular also possible to generate two spatially separate radar lobes by means of the antenna arrangement 3, which lobes, for example, use converging reflection regions on the reflector 8 to provide different scanning trajectories, such that both directions of an overall detection region can be scanned synchronously by measurement regions and then, if the radar lobes meet in the middle in an at least partially overlapping reflection region, a further amplification in a preferred region around a preferred direction is allowed, in which the detection reliability is then further increased.

In this case, the radar sensor 1 for changing a currently used measurement region thus functions completely without mechanical actuators, since, due to the design of the reflector device 7, all desired measurement regions can be provided by changing the radiation characteristic and/or reception characteristic, in particular by beamsteering and/or beamforming. Electronic scanning as opposed to mechanical scanning, for example by rotating the reflector 8, has therefore been described with respect to the embodiment in FIG. 1.

Since the main radiation direction (see also arrow 10) of the radar sensor 1 is no longer along the surface normal of the printed circuit board 2, the printed circuit board can ultimately be installed horizontally, such that the height of the radar sensor 1 can be reduced and in particular is determined by the height of the reflector unit 7.

FIG. 2 shows a modified embodiment of a radar sensor 1' in a plan view of the corresponding printed circuit board 2, the control unit 6 being only shown schematically for the sake of clarity. In this embodiment, the antenna elements 4 of the antenna arrangement 3 are designed as slot antennas of a waveguide 12 integrated into the printed circuit board 2. The waveguide 12 is therefore a so-called substrate integrated waveguide (SIW). A plurality of such waveguides 12 can also be used in this case. The reflector device 7 includes a plurality of identically oriented parabolic reflectors 8a, 8b, 8c and 8d arranged next to one another. Furthermore, the antenna arrangement 3 can be divided into partial antennas which, in particular also dynamically, can be assigned to different reflectors 8a-8d in order, for example, to provide lateral measurement regions (see arrows 14) in addition to measurement regions in front of the radar sensor 1' (see arrows 13). In this case, two radar lobes can also be generated at the same time, for example in order to simultaneously use and measure the measurement regions indicated by arrows 13 and arrows 14.

The antenna arrangements 3 and the control units 6 in the radar sensors 1, 1' according to the disclosure are also expediently designed for polarimetry, in order to be able to use the so-called diversity effect, for example. For example, radar signals of a different polarization can in this case be emitted and/or received in order to obtain additional information on the basis of the corresponding received polarizations and increase the detection performance of the radar sensor 1, 1'. In addition, a change in polarization can also be made when a fault is detected.

The control unit 6 can furthermore be designed to use digital beamforming in order to mask such interference sources, thus, for example, no longer receiving radar signals from certain solid angle segments from which interference is detected.

FIG. 3 shows a detail of a front portion of a motor vehicle 15 according to some aspects of the disclosure. It can be seen in the figure that an installation space having a low height, for example a height of 15 mm, remains between a headlight 16 and a bumper structure 17. This installation space is used by a radar sensor 1, 1' according to the disclosure, which can be designed to have a low height, due to the deflection of the signal path, but a long range. In particular, the radar sensor 1, 1' is therefore a long-range radar sensor 1, 1', the radar data of which can be used, for example, by a longitudinal vehicle system, for example an ACC system, of the motor vehicle 15. Other installation spaces having a low height, for example on a rear spoiler, on the blackened edge of a windshield and/or between radiator ribs can also be used for radar sensors 1, 1' according to the disclosure.

The invention claimed is:

1. A radar sensor for a motor vehicle, the radar sensor comprising:
   a control unit;
   an antenna arrangement; and
   a reflector device configured to reflect transmitted radar signals from the antenna arrangement into a measurement region and to reflect radar signals to be received by the antenna arrangement from the measurement region, wherein the reflector device comprises a plurality of parabolic reflectors oriented toward measurement regions, with reflection regions of the reflector device being located at least partially on different ones of the plurality of parabolic reflectors, wherein the control unit is configured to control the antenna arrangement to simultaneously scan trajectories of the reflection regions located at a same parabolic reflector and simultaneously illuminate the reflection regions based on the scanning, wherein the scanning is performed by using a first lobe and a second lobe of the radar sensor to detect the radar signals reflected by an object, wherein the second lobe pivots simultaneously to an opposing direction of the first lobe, wherein the control unit is configured to change the measurement region by changing a radiation characteristic and/or a reception characteristic by beamsteering or beamforming during control of the antenna arrangement such that the reflection regions that correspond to the measurement regions are used, and wherein the reflection regions are selected so as to change over time from a first direction to a second direction over the same parabolic reflector to cause the measurement regions pass through a desired detection region by scanning the trajectories of the reflection regions inversely from the second direction to the first direction.

2. The radar sensor according to claim 1, further comprising:
a printed circuit board configured to carry the antenna arrangement, wherein a surface normal of the printed circuit board is oriented substantially perpendicularly to a radiation direction of the radar sensor.

3. The radar sensor according to claim 1, further comprising:
a printed circuit board configured to carry the antenna arrangement, wherein the reflector device is arranged on a radiation side of the antenna arrangement on the printed circuit board.

4. The radar sensor according to claim 1, wherein the reflection regions are subregions of the plurality of parabolic reflectors.

5. The radar sensor according to claim 1, wherein the antenna arrangement comprises partial antennas, which can be assigned to different ones of the plurality of parabolic reflectors, wherein the control unit is configured to control the partial antennas for simultaneous transmission using the respectively assigned reflectors or at least one reflection region comprising portions of at least two reflectors.

6. The radar sensor according to claim 1, wherein the antenna arrangement comprises at least one antenna element designed as at least one of a patch antenna, a dielectric resonator antenna, a slot antenna, or a plurality of antenna elements that form an antenna array.

7. The radar sensor according to claim 6, wherein the at least one antenna element designed as the slot antenna is formed as a substrate integrated waveguide.

8. The radar sensor according to claim 1, wherein the control unit is configured to operate the antenna arrangement for polarimetric measurement or for simultaneous illumination of same measurement region using differently polarized radar signals.

9. The radar sensor according to claim 1, wherein the control unit is designed for digital beamforming when receiving radar signals.

10. The radar sensor according to claim 9, wherein the control unit is designed for masking a solid angle segment having an interference source.

11. The radar sensor according to claim 1, wherein the control unit is configured to adjust the measurement regions to be used by the radar sensor solely by changing the radiation characteristic or the reception characteristic.

12. A motor vehicle, comprising:
at least one radar sensor comprising:
a control unit;
an antenna arrangement; and
a reflector device configured to reflect transmitted radar signals from the antenna arrangement into a measurement region and to reflect radar signals to be received by the antenna arrangement from the measurement region, wherein the reflector device comprises a plurality of parabolic reflectors oriented toward measurement regions, with reflection regions of the reflector device being located at least partially on different ones of the plurality of parabolic reflectors, wherein the control unit is configured to control the antenna arrangement to simultaneously scan trajectories of the reflection regions located at a same parabolic reflector and simultaneously illuminate the reflection regions based on the scanning, wherein the scanning is performed by using a first lobe and a second lobe of the radar sensor to detect the radar signals reflected by an object, wherein the second lobe pivots simultaneously to an opposing direction of the first lobe, wherein the control unit is configured to change the measurement region by changing radiation characteristic and/or reception characteristic by beamsteering or beamforming during control of the antenna arrangement such that the reflection regions that correspond to the measurement regions are used, and wherein the reflection regions are selected so as to change over time from a first direction to a second direction over the same parabolic reflector to cause the measurement regions pass through a desired detection region by scanning the trajectories of the reflection regions inversely from the second direction to the first direction.

13. The motor vehicle according to claim 12, wherein at least one of the at least one radar sensor is covered or is installed in an installation space in the motor vehicle that has a vertical extension of less than 20 mm in a rear spoiler or below a headlight of the motor vehicle.

14. A method for operating a radar sensor, the method comprising:
reflecting, by a reflector device of the radar sensor, transmitted radar signals from an antenna arrangement of the radar sensor into a measurement region;
reflecting, by the reflector device, radar signals to be received by the antenna arrangement from the measurement region, wherein the reflector device comprises a plurality of parabolic reflectors oriented toward measurement regions, with reflection regions of the reflector device being located at least partially on different ones of the plurality of parabolic reflectors;
controlling, using a control unit of the radar sensor, the antenna arrangement to simultaneously scan trajectories of the reflection regions located at a same parabolic reflector and simultaneously illuminate the reflection regions based on the scanning, wherein the scanning is performed by using a first lobe and a second lobe of the radar sensor to detect the radar signals reflected by an object, wherein the second lobe pivots simultaneously to an opposing direction of the first lobe;

changing, using the control unit of the radar sensor and during control of the antenna arrangement, the measurement region by changing a radiation characteristic by beamsteering, such that the reflection regions that correspond to the measurement regions are used, wherein the reflection regions are selected so as to change over time from a first direction to a second direction over the same parabolic reflector; and causing, using the control unit of the radar sensor, the measurement regions pass through a desired detection region by scanning the trajectories of the reflection regions inversely from the second direction to the first direction.

15. The radar sensor according to claim 1, wherein a superposition of the first lobe and the second lobe of the radar sensor at a center of the reflection regions results in a greater range of detection.

* * * * *